(12) United States Patent
Kamiya

(10) Patent No.: US 8,039,522 B2
(45) Date of Patent: Oct. 18, 2011

(54) LATENT CURING AGENT

(75) Inventor: Kazunobu Kamiya, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 357 days.

(21) Appl. No.: 11/813,825

(22) PCT Filed: Aug. 4, 2005

(86) PCT No.: PCT/JP2005/014276
§ 371 (c)(1),
(2), (4) Date: Dec. 8, 2008

(87) PCT Pub. No.: WO2006/075415
PCT Pub. Date: Jul. 20, 2006

(65) Prior Publication Data
US 2009/0209669 A1    Aug. 20, 2009

(30) Foreign Application Priority Data

Jan. 12, 2005  (JP) .............................. P2005-005029

(51) Int. Cl.
*C08J 9/36* (2006.01)
(52) U.S. Cl. ........................................................ 521/55
(58) Field of Classification Search .................... 528/87; 521/55
See application file for complete search history.

(56) References Cited

U.S. PATENT DOCUMENTS

| | | | |
|---|---|---|---|
| 3,231,597 A * | 1/1966 | Fischer ........................... | 528/55 |
| 5,532,304 A * | 7/1996 | Miyazaki et al. .............. | 524/261 |
| 5,684,079 A * | 11/1997 | Yumoto et al. ................. | 524/459 |
| 6,794,038 B2 | 9/2004 | Matsushima | |
| 6,921,782 B2 | 7/2005 | Matsushima | |
| 2002/0177654 A1* | 11/2002 | Erdem et al. ................... | 524/801 |
| 2003/0055197 A1* | 3/2003 | Morikawa et al. .............. | 528/44 |
| 2003/0159773 A1* | 8/2003 | Tomiyama et al. ........... | 156/248 |

(Continued)

FOREIGN PATENT DOCUMENTS

EP   1 666 516   6/2006

(Continued)

OTHER PUBLICATIONS

European Search Report dated Jun. 28, 2010, for corresponding Patent Application No. 10162712.3.

(Continued)

*Primary Examiner* — Mark Eashoo
*Assistant Examiner* — David Karst
(74) *Attorney, Agent, or Firm* — K&L Gates LLP

(57) ABSTRACT

An aluminum chelating agent-based latent curing agent is provided that can rapidly cure thermosetting epoxy resins at relatively low temperatures. A method for producing the aluminum chelating agent-based latent curing agent is also provided that enables relatively facile control of the curing conditions therefor. The latent curing agent holds an aluminum chelating agent in a porous resin obtained by the interfacial polymerization of a polyfunctional isocyanate compound, and when the latent curing agent is incorporated in a curable epoxy resin composition for differential scanning calorimetric (DSC) measurement, the DSC exothermic peak temperature of the curable epoxy resin composition for DSC measurement that contains the latent curing agent that has been treated by immersion in a nonaqueous polar solvent can be brought to not less than the DSC exothermic peak temperature of the curable epoxy resin composition for DSC measurement that incorporates the latent curing agent that has not been subjected to the immersion treatment.

7 Claims, 2 Drawing Sheets

U.S. PATENT DOCUMENTS

| | | | | |
|---|---|---|---|---|
| 2003/0219619 A1 * | 11/2003 | Noro et al. | | 428/620 |
| 2004/0109943 A1 * | 6/2004 | Matsushima et al. | | 427/212 |
| 2004/0110004 A1 | 6/2004 | Matsushima | | |
| 2007/0010636 A1 * | 1/2007 | Kamiya et al. | | 525/523 |

FOREIGN PATENT DOCUMENTS

| | | |
|---|---|---|
| JP | 63-223027 | 9/1988 |
| JP | 11-343332 | 12/1999 |
| JP | 2002-212537 | 7/2002 |
| JP | 2002-363255 | 12/2002 |
| JP | 2002-368047 | 12/2002 |
| JP | 2006-070051 | 3/2006 |
| JP | 2009-203477 | 9/2009 |
| WO | 03/068840 | 8/2003 |
| WO | WO 2005033173 A1 * | 4/2005 |

OTHER PUBLICATIONS

Japanese Office Action dated Nov. 17, 2010, for corresponding Patent Application No. JP 2005-005029.

* cited by examiner

LATENT CURING AGENT

TECHNICAL FIELD

The present invention relates to a latent curing agent that can initiate curing of thermosetting epoxy resin compositions at relatively low temperature. The present invention also relates to a method for producing such a latent curing agent, as well as to a thermosetting epoxy resin composition that contains the latent curing agent and is thus highly stable during storage.

BACKGROUND ART

Thermosetting epoxy resin compositions are widely used as adhesives and molding materials. Among different curing agents used to cure thermosetting epoxy resin compositions are imidazole latent curing agents. These imidazole latent curing agents do not cure under normal storage conditions and are thus widely used to make thermosetting epoxy resin compositions into one-pack type curable compositions that are easy to handle and are stable during storage. One example of such imidazole latent curing agents includes an agent provided in the form of microcapsules in which particles of an imidazole compound are coated with a cured epoxy resin. The imidazole compound is capable of curing epoxy resins.

However, since the coating of this microcapsule-type imidazole latent curing agent is mechanically and thermally stable, this latent curing agent must be heated to 180° C. or above under pressurized conditions to initiate the curing reaction. This makes the imidazole latent curing agent inapplicable to recently developed epoxy resin compositions that are designed to cure at low temperatures.

For this reason, new latent curing agents have been proposed that can cure epoxy resin compositions quickly at low temperature. One is a microcapsule-type aluminum chelating agent-based latent curing agent (Patent Document 1). This latent curing agent comprises particles of an aluminum chelating agent (mother particles) and fine particles of polyvinyl alcohol (child particles) hybridized to the surface of the mother particles. The aluminum chelating agent acts with a silane coupling agent to cause an epoxy resin to polymerize cationically. Another is also a microcapsule-type aluminum chelating agent-based latent curing agent (Patent Document 2). This agent comprises particles of an aluminum chelating agent (mother particles) and fine particles of a fluorine resin (child particles) hybridized to the surface of the mother particles.

The detail of the curing process of the aluminum chelating agent-based latent curing agent is described in Patent Document 1, paragraphs 0007 through 0010.

Patent Document 1 Japanese Patent Application Laid-Open No. 2002-212537

Patent Document 2 Japanese Patent Application Laid-Open No. 2002-363255

DISCLOSURE OF THE INVENTION

However, the hybridization technique for forming microcapsules of aluminum chelating agent-based latent curing agents involves allowing child particles to collide to mother particles to form the microcapsule wall. As a result, the microcapsules obtained tend to have non-uniform and rough surfaces, and the resulting curing agents cannot achieve stable curing characteristics, making it difficult to control the conditions for curing.

For this reason, the inventor of the present invention has already proposed the production of an aluminum chelating agent-holding porous resin particle as a latent curing agent by O/W-type interfacial polymerization (Japanese Patent Application No. 2004-246231). This latent curing agent has shown properties far superior to those of prior-art latent curing agents. This latent curing agent is produced by adding an oil phase solution of an aluminum chelating agent and an isocyanate compound dissolved in ethyl acetate to a surfactant- and dispersant-containing aqueous phase and carrying out polymerization while homogenizing with a stirring blade-type homogenizer. As a consequence, the polymerization reaction at the surface of the oil droplet in contact with the water progresses to a greater degree than the polymerization reaction within the oil droplet, resulting in a tendency for the internal degree of crosslinking to be less than the surface degree of crosslinking. As a result, when this latent curing agent is dispersed in a polar solvent, there is a tendency for its latency to be reduced due to erosion of the polymer constituent of the latent curing agent. A particular problem has been the reduction in the life of anisotropically conductive film fabricated from a resin composition comprising the latent curing agent, curable resin, electroconductive powder, and polar solvent.

In view of the aforementioned problems of the conventional art, it is an objective of the present invention to provide an aluminum chelating agent-based latent curing agent that can cure thermosetting epoxy resins in a relatively short period of time and at a relatively low temperature, and that does not deteriorate its latency even when treated with polar solvent. It is another objective of the present invention to provide a method for producing such an aluminum chelating agent-based latent curing agent in which curing conditions for the curing agent can be controlled in a relatively easy fashion. It is still another objective of the present invention to provide a thermosetting resin composition containing such a latent curing agent.

Means to Solve the Problems

Operating under the hypothesis that if the polymerization reaction within the polymerizing particles during interfacial polymerization were to proceed at about the same level as the polymerization reaction at the surface, there would then be little difference between the surface crosslinking degree and the internal crosslinking degree and as a result the aforementioned objectives could be achieved, the inventor of the present invention prepared a latent curing agent comprising porous resin by the interfacial polymerization of a polyfunctional isocyanate compound in the presence of an aluminum chelating agent according to a W/O/W-type interfacial polymerization method capable of forming aqueous phase microparticles in the interior of oil phase particles dispersed in an aqueous phase. The inventor of the present invention also investigated the reduction in latency of curable epoxy resin compositions for differential scanning calorimetry (DSC) measurement (abbreviated below as DSC-measurement curable epoxy resin compositions) that contained this latent curing agent. It was discovered as a result that the aforementioned objectives could be achieved by the use of a latent curing agent that enables the DSC exothermic peak temperature for the use of the latent curing agent that has been treated by immersion in nonaqueous polar solvent capable of dissolving the aluminum chelating agent constituent of the latent curing agent to be brought to not less than the DSC exothermic peak temperature for the use of the latent curing agent that has not been subjected to the immersion treatment. This invention was achieved based on this discovery.

More specifically, the present invention provides a latent curing agent in which an aluminum chelating agent is held in a porous resin obtained by the interfacial polymerization of a polyfunctional isocyanate compound, wherein, when said latent curing agent is incorporated in a curable epoxy resin composition for differential scanning calorimetric (DSC) measurement, the DSC exothermic peak temperature of the curable epoxy resin composition for DSC measurement that contains the latent curing agent that has been treated by immersion in a nonaqueous polar solvent can be brought to not less than the DSC exothermic peak temperature of the curable epoxy resin composition for DSC measurement that contains the latent curing agent that has not been subjected to the immersion treatment.

The present invention also provides a method for producing the aforesaid latent curing, comprising introducing an aqueous solution containing an emulsifying agent into a solution prepared by dissolving an aluminum chelating agent and a polyfunctional isocyanate compound in a volatile organic solvent;

emulsifying the resulting solution by ultrasonic homogenization;

emulsifying and dispersing the resulting emulsion in an aqueous phase that contains a dispersing agent; and thereafter carrying out interfacial polymerization by heating and stirring.

The present invention additionally provides a thermosetting resin composition, comprising the aforesaid latent curing agent, a silane coupling agent, and a thermosetting resin.

MERITS OF THE INVENTION

The latent curing agent according to the present invention comprises an aluminum chelating agent held in a porous resin obtained by the interfacial polymerization of a polyfunctional isocyanate compound and, when incorporated in a DSC-measurement curable epoxy resin composition, enables the DSC exothermic peak temperature of the DSC-measurement curable epoxy resin composition that contains the latent curing agent that has been treated by immersion in a nonaqueous polar solvent capable of dissolving the aluminum chelating agent constituting the latent curing agent to be brought to not less than the DSC exothermic peak temperature of the DSC-measurement curable epoxy resin composition that incorporates the latent curing agent that has not been subjected to the immersion treatment. Accordingly, the latent curing agent according to the present invention not only can rapidly cure thermosetting epoxy resins at relatively low temperatures, but when used in, for example, anisotropically conductive film, does not shorten the life of the film. In addition, because the method according to the present invention for producing the latent curing agent utilizes the interfacial polymerization of a W/O/W emulsion prepared using a W/O emulsion produced by ultrasonic homogenization, the same composition can be used as for the O/W type and relatively facile control of the curing conditions with the latent curing agent is made possible.

BEST MODE FOR CARRYING OUT THE INVENTION

Figure 1:
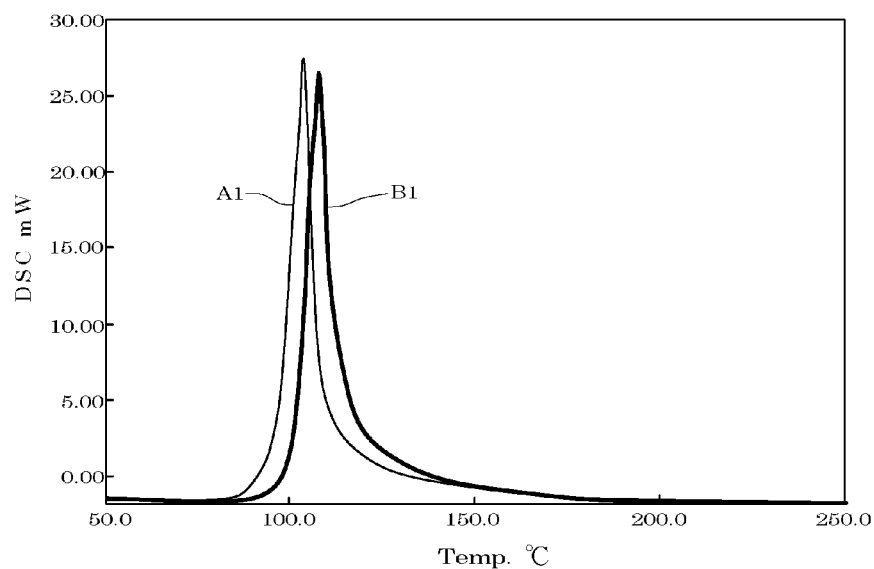
FIG. 1 is the DSC trace for the DSC-measurement curable epoxy resin compositions (A1) and (B1) prepared in Example 1.

The latent curing agent of the present invention comprises an aluminum chelating agent and a porous resin carrying the aluminum chelating agent, the porous resin being obtained through interfacial polymerization of a polyfunctional isocyanate compound. The aluminum chelating agent imparts to the latent curing agent an ability to cure thermosetting resin compositions quickly and at low temperatures. Furthermore, the aluminum chelating agent is carried by the porous resin obtained through interfacial polymerization. Therefore, when a thermosetting resin composition is mixed with the latent curing agent (in other words, when a one-pack type composition is composed of the thermosetting resin composition and the latent curing agent), the thermosetting resin composition is improved in respect of stability during storage. Moreover, when the latent curing agent according to the present invention is incorporated in a DSC-measurement curable epoxy resin composition, the DSC exothermic peak temperature of the DSC-measurement curable epoxy resin composition containing the latent curing agent that has been treated by immersion in nonaqueous polar solvent capable of dissolving the aluminum chelating agent constituting the latent curing agent can be brought to not less than the DSC exothermic peak temperature of the DSC-measurement curable epoxy resin composition containing the latent curing agent that has not been subjected to the immersion treatment. Accordingly, since the latent curing agent according to the present invention does not deteriorate its latency even when treated by nonaqueous polar solvent, it is suitable for application in particular to anisotropically conductive films.

The nonaqueous polar solvent referenced by this invention is a nonaqueous polar solvent capable of dissolving the aluminum chelating agent constituting the latent curing agent and preferably is a volatile nonaqueous polar solvent. "Nonaqueous polar solvent" as used herein denotes polar solvents other than water. "Polar" denotes the presence of polarization in the electric charge within the molecule. Accordingly, when the latent curing agent is immersed in such a nonaqueous polar solvent, latent curing agent whose porous resin constituent has a dense degree of crosslinking will be resistant to this immersion in nonaqueous polar solvent and will be resistant to erosion and will as a consequence maintain its latency. In the event, on the other hand, of a coarse degree of crosslinking, erosion occurs and a reduction in latency can be presumed. The latent curing agent according to the present invention—which can provide a DSC exothermic peak temperature for the DSC-measurement curable epoxy resin composition containing the latent curing agent treated by immersion in a nonaqueous polar solvent capable of dissolving the aluminum chelating agent constituting the latent curing agent that is not less than the DSC exothermic peak temperature of the DSC-measurement curable epoxy resin composition containing the latent curing agent not subjected to the immersion treatment—thus does not exhibit a reduction in its latency, and it can therefore be logically presumed that the degree of crosslinking is dense not just at the surface, but also in the interior. With regard to the specific numerical value range for "not less than the DSC exothermic peak temperature", this temperature difference is preferably in the range of 0 to +10° C. The reason for this is as follows: when this temperature difference has an excessively large positive value, the latency of the latent curing agent is raised, but the low temperature curability is reduced. The specific DSC measurement procedure can be carried out based on the procedure described in JIS K 1029. A rate of temperature rise of 5° C./minute is an example of the typical measurement condition. A usable DSC measurement instrument is the DSC6200 from Seiko Instruments Inc.

A variety of organic solvents that satisfy the preceding conditions can be used as the nonaqueous polar solvent capable of dissolving the aluminum chelating agent constituting the latent curing agent. Examples thereof include organic solvents that contain an ester, carbonyl, or hydroxyl group.

In a specific example of the procedure for carrying out the immersion treatment of the latent curing agent with the aforementioned nonaqueous polar solvent, the latent curing agent is introduced into 10- to 1000-weight fold nonaqueous polar solvent and is ultrasonically dispersed and is then held for about 1 to 6 hours at 25 to 45° C. followed by recovery by filtration and drying.

The ability to cure in a short period of time declines when too low is the ratio of the DSC exothermic peak intensity for the DSC-measurement curable epoxy resin composition that contains the immersion-treated latent curing agent, to the DSC exothermic peak intensity for the DSC-measurement curable epoxy resin composition that contains the latent curing agent not subjected to immersion treatment by the nonaqueous polar solvent. For this reason, this ratio is preferably not less than 60% and more preferably is not less than 80%. When the thermal peak has undergone a shift, the amount of heat generated will in some cases be 100% or more because curing starts at higher temperatures.

In this invention, the DSC-measurement curable epoxy resin composition that contains the latent curing agent refers to a composition that has liquid thermosetting epoxy resin as its main component and that is prepared for the purpose of DSC measurement. While various thermosetting epoxy resins can be used in this invention, the use of an alicyclic epoxy resin (CEL2021P, Daicel Chemical Industries, Ltd.) is preferred from the standpoint of handling. The DSC-measurement curable epoxy resin composition may also contain a coupling agent as widely used by ordinary thermosetting resin compositions. The latent curing agent is incorporated in the DSC-measurement curable epoxy resin composition preferably at 0.001 to 10 weight parts and more preferably at 0.001 to 1 weight part per 100 weight parts of the curable epoxy resin. When a coupling agent is used, it is used preferably at 0.01 to 30 weight parts and more preferably at 0.01 to 10 weight parts per 100 weight parts of the curable epoxy resin.

The latent curing agent according to the present invention does not have a simple microcapsule structure in which the circumference of a core of an aluminum chelating agent is covered by a porous resin shell; rather, it has a structure in which the aluminum chelating agent is held or retained in the large number of microscopic pores present in a porous resin matrix.

The latent curing agent of the present invention is produced by interfacial polymerization and thus is formed into spheres, which are preferably sized from 0.5 to 100 μm in terms of the curability and dispersibility. The pores are preferably sized from 5 to 150 nm in terms of the curability and latency.

If the degree of crosslinking of the porous resin is too small, the latency of the latent curing agent tends to decrease, whereas if the degree of crosslinking of the porous resin is too large, the heat response of the latent curing agent tends to decrease. Thus, a porous resin with a controlled degree of crosslinking is preferably used depending on the intended use of the curing agent.

It is preferred that the latent curing agent of the present invention is substantially organic solvent-free, where the organic solvent corresponds to nonaqueous polar solvents used at least during ultrasonic homogenization. Specifically, it preferably contains 1 ppm or less organic solvent for use in interfacial polymerization to ensure stability of curing.

The amount of the aluminum chelating agent relative to the porous resin in the latent curing agent of the present invention is preferably 10 to 200 parts by mass and, more preferably, 10 to 150 parts by mass relative to 100 parts by mass of the porous resin. Too little of the aluminum chelating agent results in a decreased heat response of the latent curing agent, whereas too much of the aluminum chelating agent results in a decreased latency of the latent curing agent.

One example of the aluminum chelating agents for use in the latent curing agent of the present invention includes a group of complex compounds in which three β-ketoenolate anions are coordinated to aluminum as shown in the following formula (1).

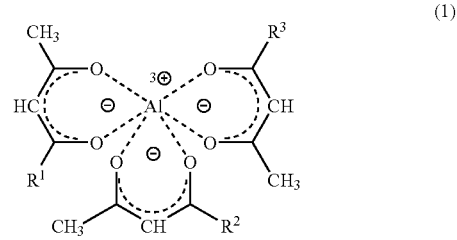

(1)

In the formula (1), $R^1$, $R^2$, and $R^3$ are each independently an alkyl or alkoxyl group. Examples of the alkyl group include methyl and ethyl. Examples of the alkoxyl group include methoxy, ethoxy, and oleyloxy.

Specific examples of the aluminum chelating agents represented by the formula (1) include aluminum tris(acetylacetonate), aluminum tris(ethylacetoacetate), aluminum monoacetylacetonate bis(ethylacetoacetate), aluminum monoacetylacetonate bisoleylacetoacetate, ethylacetoacetate aluminum diisopropylate, and alkylacetoacetate aluminum diisopropylate.

The polyfunctional isocyanate compound for use in the present invention preferably contains two or more, in particular three isocyanate groups in one molecule. Preferred examples of such trifunctional isocyanate compounds are trimethylolpropane (TMP) adducts obtained by reacting 1 mol of TMP with 3 mol of a diisocyanate compound, as represented by the following formula (2); isocyanurates obtained by self-condensation of 3 mol of a diisocyanate compound, as represented by the following formula (3); and biurets obtained by condensation of diisocyanate urea obtained from 2 mols of 3 mols of a diisocyanate compound with the remaining 1 mol of a diisocyanate compound, as represented by the following formula (4).

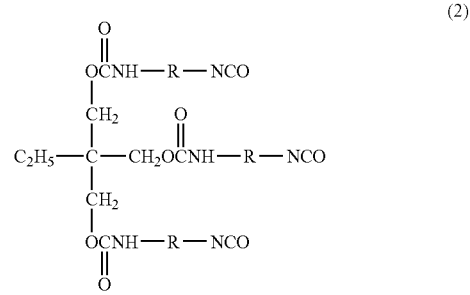

(2)

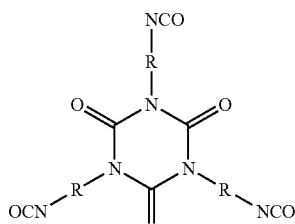

(3)

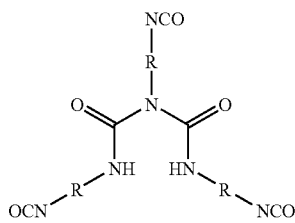

(4)

In the formulas (2) through (4), the substituent R is the moiety of the diisocyanate molecule other than the isocyanate group. Specific examples of the diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, and methylenediphenyl-4,4'-diisocyanate.

During the interfacial polymerization of the polyfunctional isocyanate compounds for forming the porous resin, a part of the isocyanate group is hydrolyzed to an amino group, which reacts with an isocyanate group by forming a urea bond, thus forming a porous polyurea. When the latent curing agent composed of such a porous resin and the aluminum chelating agent retained in the pores of the resin is heated for curing, the retained aluminum chelating agent comes into contact with the silane coupling agent and the thermosetting resin that coexists with the latent curing agent, though the underlying mechanism is unknown. As a result, the curing reaction proceeds.

Although the aluminum chelating agent is considered to be present on the outer surface of the particles of the latent curing agent, the chelating agent on the surface of the latent curing agent is immediately inactivated by the water present in the reaction system during the interfacial polymerization. Thus, only the aluminum chelating agent retained within the porous resin remains active. This active chelating agent within the porous resin is thought to be responsible for the latency of the resulting curing agent.

The latent curing agent according to the present invention can be produced by a production method in which an aqueous solution containing an emulsifying agent is introduced into a solution prepared by dissolving an aluminum chelating agent and a polyfunctional isocyanate compound in a volatile organic solvent; the aqueous solution is emulsified therein by ultrasonic homogenization; the resulting emulsion is emulsified and dispersed in an aqueous phase that contains dispersing agent; and interfacial polymerization is then carried out by heating and stirring.

In this method, the aluminum chelating agent and the polyfunctional isocyanate compound are first dissolved in a volatile organic solvent to form a solution to serve as the organic phase in the interfacial polymerization. The volatile organic solvents are used for the following reason: Other organic solvents with high boiling points of more than 300° C. that are normally used in interfacial polymerization processes do not evaporate during the interfacial polymerization. As a result, the chance of isocyanate coming into contact with water does not increase significantly, so that the polymerization does not proceed to a sufficient degree at the interface. This makes it difficult to obtain polymer products with high shape-retaining characteristic by interfacial polymerization, and even if it is obtained, the high-boiling-point solvent remaining in the polymer product undesirably affects the physical properties of the cured product of the thermosetting resin composition when the latent curing agent is used to cure the thermosetting resin composition. For this reason, volatile organic solvents are used as organic solvents in the preparation of the organic phase.

With regard to the blending proportions of the polyfunctional isocyanate compound and aluminum chelating agent in the production method according to the present invention, too little of the latter results in a reduced curability, while too much results in a reduced latency, and for these reasons the latter is used preferably at 10 to 200 weight parts and more preferably at 10 to 150 weight parts per 100 weight parts of the former.

Preferably, the volatile organic solvents can effectively dissolve both the aluminum chelating agent and the polyfunctional isocyanate compound (i.e., the solubility of each solute in the organic solvent is preferably 0.1 g/ml (organic solvent) or higher), is substantially incompatible with water (i.e., the solubility of water in the organic solvent is 0.5 g/ml (organic solvent) or lower), and has a boiling point of 100° C. or below under the atmospheric pressure. Examples of such volatile organic solvents are alcohols, acetic acid esters, and ketones. Of these solvents, ethyl acetate is particularly preferred because of its high polarity, low boiling point, and poor solubility in water.

The volatile organic solvent is preferably used in an amount of 100 to 500 parts by mass relative to 100 parts by mass of the sum of the aluminum chelating agent and the polyfunctional isocyanate compound. Too little of the volatile organic solvent results in a decreased latency, whereas too much of solvent causes a decrease in the heat response.

While the aluminum chelating agent and the polyfunctional isocyanate compound may be dissolved in the volatile organic solvent under atmospheric pressure and at room temperature, the resulting reaction mixture may be heated, if necessary.

An aqueous solution of an emulsifier dissolved in water is then introduced into the aforementioned oil phase solution and ultrasonic homogenization is carried out. This results in the production of a W/O emulsion. In particular, a size of about 1 to 1000 nm is obtained for the aqueous phase particles in the oil phase solution due to the use of ultrasound in the homogenization treatment. The ultrasonic homogenization device can be exemplified by ultrasonic cleaners (for example, the Bransonic 2510J-DTH, available from Branson Ultrasonic Corporation) and ultrasonic homogenizers (for example, the VCX 750 available from Sonics & Materials, Inc.). Ultrasonic homogenizers are more preferred from the standpoint of obtaining finer sizes.

The rate of addition to the oil phase solution of the aqueous solution of an emulsifier dissolved in water is preferably 0.1 to 30 volume parts and more preferably 0.1 to 10 volume parts per 100 volume parts of the oil phase solution.

Usable as the emulsifying agent are nonionic surfactants and anionic surfactants such as sodium dodecylbenzenesulfonate. The surfactant is used preferably at 0.01 to 10 weight % in the aqueous solution. Anionic surfactants such as sodium dodecylbenzenesulfonate are preferred among the preceding based on considerations of emulsion stability.

The obtained W/O emulsion is then emulsified and dispersed in an aqueous phase containing a dispersing agent, after which interfacial polymerization is carried out with heating and stirring. A W/O/W dispersion undergoes interfacial polymerization as a consequence, and the polymerization reaction advances not just at the outer surface of the oil phase particles, but also in the interior thereof, causing there to be little difference between the degree of crosslinking at the outer surface and the degree of crosslinking in the interior. This makes it possible as a result to avoid reduced latency by the latent curing agent. Usable as the dispersing agent are those employed in ordinary interfacial polymerization, such as polyvinyl alcohol, carboxymethyl cellulose, gelatin, and so forth. The dispersing agent is generally used at 0.1 to 10.0 mass % of the aqueous phase.

The amount of the oil phase solution relative to the aqueous phase is preferably 5 to 50 parts by mass relative to 100 parts by mass of the aqueous phase. Too little of the oil phase solution results in polydisperse size distribution, whereas too much of the oil phase solution causes formation of aggregates of fine particles.

The dispersing conditions used during interfacial polymerization are stirring conditions (stirrer-type homogenizer, stirring rate not less than 8000 rpm) that make the size of the oil phase about 100 to 10,000 times the size of the aqueous phase particles produced in the oil phase solution by the ultrasonic homogenization treatment. The conditions can generally be exemplified by heating and stirring at atmospheric pressure at 30 to 80° C. for 2 to 12 hours.

Upon completion of the interfacial polymerization, the resulting fine particles of the polymer are separated by filtration and are allowed to dry to give the latent curing agent of the present invention.

The above-described production method of the present invention makes it possible to control the curing characteristics of the latent curing agent by changing the types and the amounts of the polyfunctional isocyanate compound and the aluminum chelating agent, and the conditions for interfacial polymerization. For example, lowering temperature for the polymerization can decrease the curing temperature. Conversely, increasing temperature for polymerization can increase the curing temperature.

The latent curing agent of the present invention can be used in the same applications as the conventional imidazole latent curing agents. The latent curing agent of the present invention is preferably used together with a silane coupling agent and a thermosetting resin to provide thermosetting resin compositions that cure quickly at low temperatures.

With regard to the content of the latent curing agent in the thermosetting resin composition, too little results in an unsatisfactory cure, while too much results in a deterioration in the resin properties (for example, the flexibility) of the cured product obtained by the composition, and for these reasons the latent curing agent content is 1 to 70 mass parts and preferably 1 to 50 mass parts per 100 mass parts of the thermosetting resin.

The silane coupling agent used in the thermosetting resin composition, as described in paragraphs 0007 through 0010 of Japanese Patent Application Laid-Open No. 2002-212537, cooperates with the aluminum chelating agent to initiate cationic polymerization of thermosetting resins (e.g., thermosetting epoxy resins). The silane coupling agent has 1 to 3 lower alkoxyl groups in its molecule and may have vinyl, styryl, acryloyloxy, methacryloyloxy, epoxy, amino, mercapto, and other functional groups that can react with the functional groups of the thermosetting resins.

This silane coupling agent can be specifically exemplified by vinyltris(β-methoxyethoxy)silane, vinyltriethoxysilane, vinyltrimethoxysilane, γ-styryltrimethoxysilane, γ-methacryloxypropyltrimethoxysilane, γacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, and so forth.

The amount of the silane coupling agent in the thermosetting resin composition is typically 50 to 1500 parts by mass, and more preferably 300 to 1200 parts by mass relative to 100 parts by mass of the latent curing agent. Too little of the silane coupling agent results in a decreased curability, whereas too much of the agent causes a decrease in the resin properties (e.g., stability during storage) of the cured product of the composition.

Examples of the thermosetting resin include a thermosetting epoxy resin, thermosetting urea resin, thermosetting melamine resin, or thermosetting phenol resin. Of these thermosetting resins, thermosetting epoxy resins are particularly preferred in view of their strong adhesion after curing.

Such thermosetting epoxy resins may be either liquid or solid and typically have an epoxy equivalent of about 100 to about 4000. These thermosetting epoxy resins preferably include two or more epoxy groups in their molecules. Preferred examples include bisphenol A epoxy compounds, phenol novolac epoxy compounds, cresol novolac epoxy compounds, ester epoxy compounds, and alicyclic epoxy compounds. These compounds may be monomers or oligomers.

When necessary, fillers such as silica and mica, pigments and antistats may be added to the thermosetting resin composition of the present invention. Preferably, the thermosetting resin composition of the present invention contains 1 to 10 mass % of conductive particles, metal particles or resin cores of the order of several micrometers covered with metal plating layer, which may further be covered with insulation film. This allows the use of the thermosetting resin composition of the present invention as an anisotropic conductive adhesive paste or anisotropic conductive film.

The thermosetting resin composition of the present invention can be produced by uniformly mixing the latent curing agent, the silane coupling agent, the thermosetting resin and other optional additives according to conventional techniques.

Furthermore, the latent curing agent cooperates with the silane coupling agent to cause the thermosetting resin to undergo cationic polymerization quickly and at low temperatures.

EXAMPLES

The present invention will now be described in detail with reference to examples.

Example 1

An oil phase solution was prepared by dissolving the following in 30 weight parts ethyl acetate: 11 weight parts of a 24% isopropanol solution of aluminum monoacetylacetonate bis(ethyl acetoacetate) (Alumichelate D, available from Kawaken Fine Chemicals Co., Ltd.) and 11 weight parts of the adduct of trimethylolpropane (1 mole) with methylenediphenyl-4,4'-diisocyanate (3 moles) (D-109, available from Mitsui Takeda Chemicals, Inc.).

5 mL of an aqueous sodium dodecylbenzenesulfonate solution (3 weight %) was added to this oil phase solution, which was then homogenized for 10 seconds at room temperature with an ultrasonic homogenizer (VCX 750, available from Sonics & Materials, Inc.) to yield a white emulsion.

This emulsion was introduced into a thermometer-equipped 3-liter interfacial polymerization vessel into which the following had already been introduced: 800 weight parts distilled water, 0.05 weight part surfactant (Newrex R-T, available from NOF Corporation), and 4 weight parts polyvinyl alcohol (PVA-205, available from Kuraray Co., Ltd.) added as dispersing agent. After emulsification and mixing with a stirring blade-type homogenizer (11,000 rpm/10 minutes, available from IKA), interfacial polymerization was carried out for 3 hours at 60° C.

After completion of the reaction, the polymerization reaction solution was allowed to stand to cool to room temperature and the interfacial polymer particles were then separated by filtration and were allowed to dry to give 20 weight parts of a spherical latent curing agent (W/O/W type) with a particle size of about 10 μm.

Example 2

20 weight parts of a latent curing agent were obtained as in Example 1, but using an ultrasonic cleaner (Bransonic 2500J-DTH, available from Branson Ultrasonic Corporation) in place of the ultrasonic homogenizer.

Comparative Example 1

800 weight parts of distilled water, 0.05 weight part of a surfactant (Newrex R-T, available from NOF Corporation), and 4 weight parts of polyvinyl alcohol (PVA-205, available from Kuraray Co., Ltd.) as dispersing agent were introduced into a thermometer-equipped 3-liter interfacial polymerization vessel and were mixed throughly. To the resulting mixture was then added an oil phase solution prepared by dissolving the following in 30 weight parts ethyl acetate: 11 weight parts of a 24% isopropanol solution of aluminum monoacetylacetonate bis(ethyl acetoacetate) (Alumichelate D, available from Kawaken Fine Chemicals Co., Ltd.) and 11 weight parts of the adduct of trimethylolpropane (1 mole) with methylenediphenyl-4,4'-diisocyanate (3 moles) (D-109, available from Mitsui Takeda Chemicals, Inc.). After emulsification and mixing with an homogenizer (11,000 rpm/10 minutes, available from IKA), interfacial polymerization was carried out overnight at 60° C.

After completion of the reaction, the polymerization reaction solution was allowed to stand to cool to room temperature and the interfacial polymer particles were then separated by filtration and were allowed to dry to give 20 weight parts of a spherical latent curing agent (O/W type) with a particle size of about 10 μm.

Evaluation

Each of the latent curing agents prepared in Examples 1 and 2 and Comparative Example 1 was divided into two. One of the two was poured into 100-fold by volume of nonaqueous polar solvent (propylene glycol monomethyl ether acetate (PGMEA)) at room temperature and was ultrasonically dispersed using an ultrasonic cleaner. Then, while still immersed in the PGMEA, the latent curing agent was allowed to stand for 4 hours in a 30° C. thermostat, after which it was filtered off and dried to give latent curing agent that had been treated by immersion in nonaqueous polar solvent.

DSC-measurement curable epoxy resin compositions (B1), (B2), and (B3) were prepared by mixing 90 weight parts of alicyclic epoxy resin (CEL2021P, available from Daicel Chemical Industries, Ltd.) and 12 weight parts of silane coupling agent (KBM5103, available from Shin-Etsu Chemical Co., Ltd.) with 2 weight parts of the latent curing agent that had been immersed in nonaqueous polar solvent and were subjected to thermal analysis (5° C./minute rate of temperature rise) using a differential scanning calorimetry (DSC) analyzer (DSC6200, available from Seiko Instruments Inc.). The respective DSC-measurement curable epoxy resin compositions (A1), (A2), and (A3) were similarly prepared using the non-immersion-treated latent curing agents instead of the latent curing agents that had been immersed in nonaqueous polar solvent.

The DSC-measurement curable epoxy resin compositions thus prepared were subjected to a DSC analysis using a differential scanning calorimetry analyzer (DSC6200, available from Seiko Instruments Inc.) at a rate of temperature rise of 5° C./minute. The results are given in Table 1 and FIGS. 1 to 3. The exothermic peak temperature (° C.) denotes the temperature at which curing is maximally active. The exothermic peak temperature shift value (° C.) is the numerical value obtained by subtracting the exothermic peak temperature for the DSC-measurement curable epoxy resin composition (A) from the exothermic peak temperature of the DSC-measurement curable epoxy resin composition (B). A large negative value for this value is indicative of a loss of latency, while a large positive value is indicative of an increase in latency and a reduction in the low-temperature curability. The exothermic peak intensity is indicative of the rapidity of cure, and a percentage (%) for the exothermic peak intensity retention ratio (the exothermic peak intensity of the DSC-measurement curable epoxy resin composition (B) relative to the exothermic peak intensity of the DSC-measurement curable epoxy resin composition (A) (%)) near 100% is preferred because this indicates that the interior of the latent curing agent has not been eroded by the nonaqueous polar solvent.

TABLE 1

| DSC-measurement curable epoxy resin composition | | Exothermic peak temperature (° C.) | Exothermic peak temperature shift (° C.) | Exothermic peak intensity retention ratio (%) |
|---|---|---|---|---|
| Example 1 | (A1) | 103 | +4 | 97 |
|  | (B1) | 107 |  |  |
| Example 2 | (A2) | 109 | 0 | 67 |
|  | (B2) | 109 |  |  |
| Comp. Ex. 1 | (A3) | 110 | −8 | 56 |
|  | (B3) | 102 |  |  |

Figure 2:
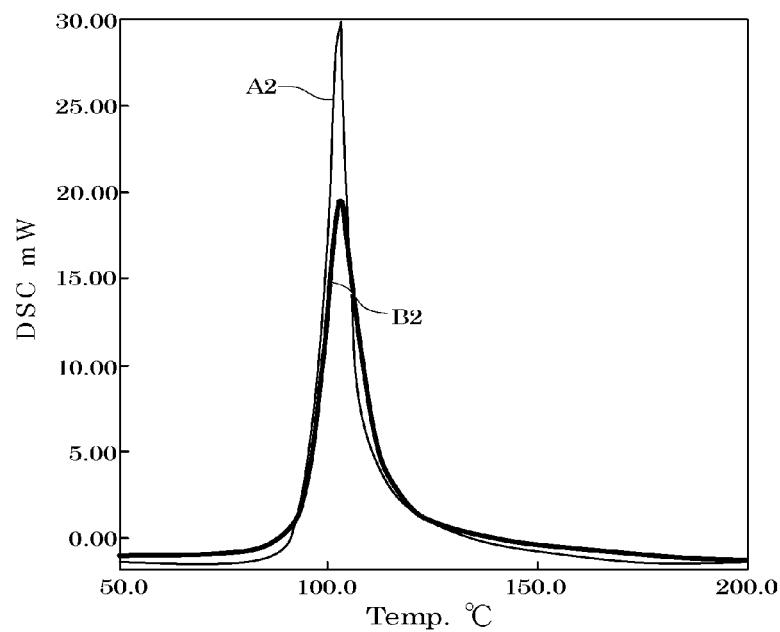
FIG. 2 is the DSC trace for the DSC-measurement curable epoxy resin compositions (A2) and (B2) prepared in Example 2.
Figure 3:
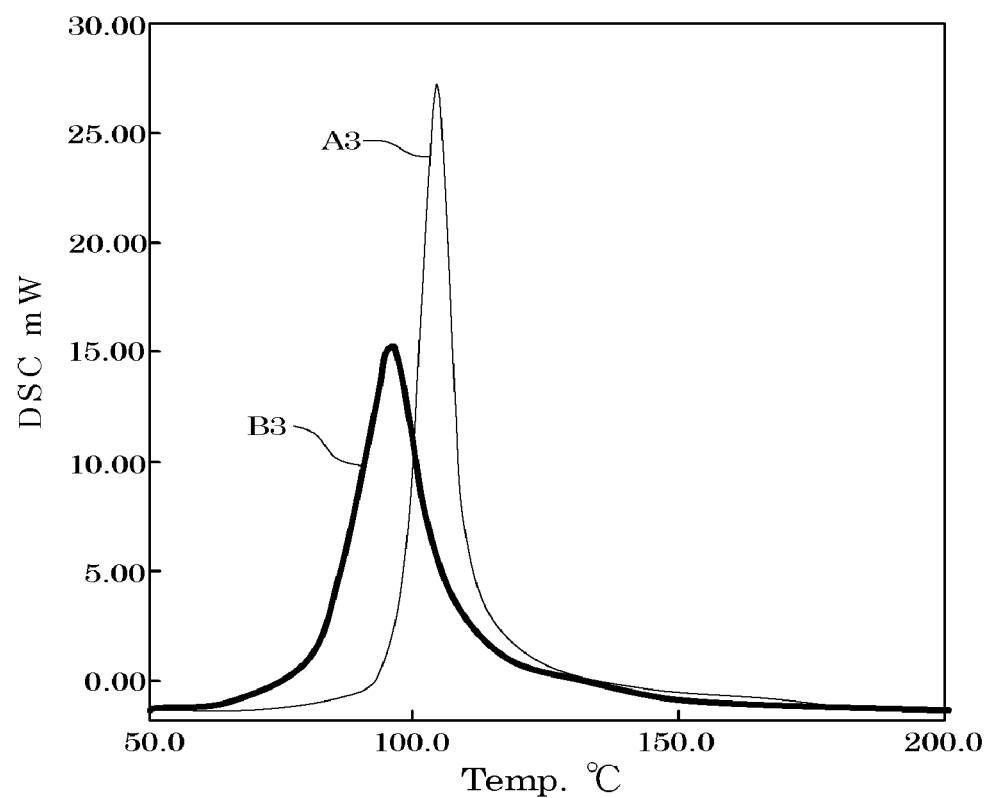
FIG. 3 is the DSC trace for the DSC-measurement curable epoxy resin compositions (A3) and (B3) prepared in Comparative Example 1.

As shown in Table 1 and FIGS. 1 to 3, the latent curing agent of Example 1, which was produced by a W/O/W-type interfacial polymerization method, has an exothermic peak temperature shift of +4° C., which indicates that there is no decline in latency. In addition, the exothermic peak intensity retention ratio is 97% which is close to 100%, which indicates an excellent stability. Because the latent curing agent of Example 2, which was produced by a W/O/W-type interfacial polymerization method, was prepared using an ultrasonic cleaner rather than an ultrasonic homogenizer, both the exothermic peak temperature shift (° C.) and the exothermic peak intensity retention ratio (%) are somewhat poorer than in Example 1, but are superior to the results for Comparative Example 1, infra.

The latent curing agent of Comparative Example 1, which was produced by an O/W-type interfacial polymerization method, has a large negative shift of −8° C. for the exothermic peak temperature shift (° C.) (that is, the latency is reduced), and also has a very low value of 56% for the exothermic peak intensity retention ratio (%). Accordingly, this shows that the immersion treatment with nonaqueous polar solvent caused the latent curing agent of Comparative Example 1 to undergo erosion not only of the surface, but also of the interior of the porous resin constituent of the latent curing agent.

INDUSTRIAL APPLICABILITY

The aluminum chelating agent-based latent curing agent according to the present invention, because it can rapidly cure thermosetting epoxy resins at relatively low temperatures, is useful as a curing agent for anisotropically conductive adhesives capable of a rapid, anisotropically conductive joining at low temperatures.

The invention claimed is:

1. A method for producing a latent curing agent in which an aluminum chelating agent is held in a porous resin obtained by the interfacial polymerization of a polyfunctional isocyanate compound, wherein, when said latent curing agent is incorporated in a curable epoxy resin composition for differential scanning calorimetric (DSC) measurement, the DSC exothermic peak temperature of the curable epoxy resin composition for DSC measurement that contains the latent curing agent that has been treated by immersion in a nonaqueous polar solvent can be brought to not less than the DSC exothermic peak temperature of the curable epoxy resin composition for DSC measurement that contains the latent curing agent that has not been subjected to the immersion treatment, the method comprising:

introducing an aqueous solution containing an emulsifying agent into a solution prepared by dissolving an aluminum chelating agent and a polyfunctional isocyanate compound in a volatile organic solvent that is a lower alkyl ester of acetic acid;

emulsifying the resulting solution by ultrasonic homogenization;

emulsifying and dispersing the resulting emulsion in an aqueous phase that contains a dispersing agent; and thereafter carrying out interfacial polymerization by heating and stirring.

2. The method of producing a latent curing agent according to claim 1, wherein the percentage of the DSC exothermic peak intensity of the curable epoxy resin composition for DSC measurement that contains the latent curing agent that has been treated by immersion in a nonaqueous polar organic solvent, with respect to the DSC exothermic peak intensity of the curable epoxy resin composition for DSC measurement that incorporates the latent curing agent that has not been subjected to the immersion treatment, is not less than 60%.

3. The method of producing a latent curing agent according to claim 1 or 2, wherein the nonaqueous polar organic solvent is an organic solvent that contains an ester group, carbonyl group, or hydroxyl group.

4. The method of producing a latent curing agent according to claim 1, wherein the aluminum chelating agent is a complex compound in which a beta-ketoenolate anion ligand is coordinated to aluminum.

5. The method of producing a latent curing agent according to claim 1, wherein the aluminum chelating agent is aluminum mono acetylacetonate bis(ethyl acetoacetate).

6. A method of producing a thermosetting resin composition, the method comprising:

forming the latent curing agent according to any of claim 1 to 5; and combining the latent curing agent with a silane coupling agent, and a thermosetting resin.

7. The method of producing a thermosetting resin composition according to claim 6, wherein the thermosetting resin is a thermosetting epoxy resin.

* * * * *